(12) United States Patent
Maulandi

(10) Patent No.: US 8,743,531 B2
(45) Date of Patent: Jun. 3, 2014

(54) DRAWOUT DISCONNECTING AND ISOLATING MEANS FOR DC APPLICATIONS

(75) Inventor: Aymon Maulandi, Robins, IA (US)

(73) Assignee: Schneider Electric USA, Inc., Palatine, IL (US)

( * ) Notice: Subject to any disclaimer, the term of this patent is extended or adjusted under 35 U.S.C. 154(b) by 168 days.

(21) Appl. No.: 13/477,430

(22) Filed: May 22, 2012

(65) Prior Publication Data

US 2013/0314847 A1    Nov. 28, 2013

(51) Int. Cl.
*H02B 11/12*    (2006.01)
*H01H 9/00*    (2006.01)

(52) U.S. Cl.
USPC ........................................ 361/608; 200/50.21

(58) Field of Classification Search
USPC .......... 361/608; 200/50.21; 218/2, 4, 5, 7, 12, 218/152–155
See application file for complete search history.

(56) References Cited

U.S. PATENT DOCUMENTS

| | | | |
|---|---|---|---|
| 2009/0127230 A1 | 5/2009 | Schmitz et al. | |
| 2010/0126966 A1 | 5/2010 | Domejean et al. | |
| 2011/0147173 A1 | 6/2011 | Lee et al. | |
| 2013/0139384 A1* | 6/2013 | Abroy | 29/854 |
| 2013/0264883 A1* | 10/2013 | Bhavaraju et al. | 307/80 |

FOREIGN PATENT DOCUMENTS

| | | | | |
|---|---|---|---|---|
| CN | 201213204 Y | * | 3/2009 | .............. H02B 1/24 |
| EP | 2061052 A2 | | 5/2009 | |
| EP | 2189996 A1 | | 5/2010 | |

OTHER PUBLICATIONS

International Search Report corresponding to co-pending International Patent Application Serial No. PCT/EP2013/041163, European Patent Office, dated Jul. 22, 2013; (4 pages).
International Written Opinion corresponding to co-pending International Patent Application Serial No. PCT/EP2013/041163, European Patent Office, dated Jul. 22, 2013; (6 pages).

\* cited by examiner

*Primary Examiner* — Robert J Hoffberg
(74) *Attorney, Agent, or Firm* — Locke Lord LLP

(57) ABSTRACT

A drawout unit that disconnects both polarities of DC current from a DC source, when all poles are used for one of the polarities leaving no pole available to disconnect the other polarity. The drawout unit includes a disconnect device having a four-pole switch, and all four poles are series-connected to the positive (ungrounded) polarity. A separate drawout module with its own housing is connected to the negative (grounded) polarity, and together, the disconnect device and the drawout module are positioned in a cradle with a racking mechanism for racking both the device and the module in and out of the cradle simultaneously, thereby obtaining total isolation of both polarities. In this configuration, the installer has the option to ground the negative polarity, while leaving the positive polarity ungrounded. The drawout module has a through bar conductor that passes the negative polarity of the DC current through the drawout unit.

16 Claims, 3 Drawing Sheets

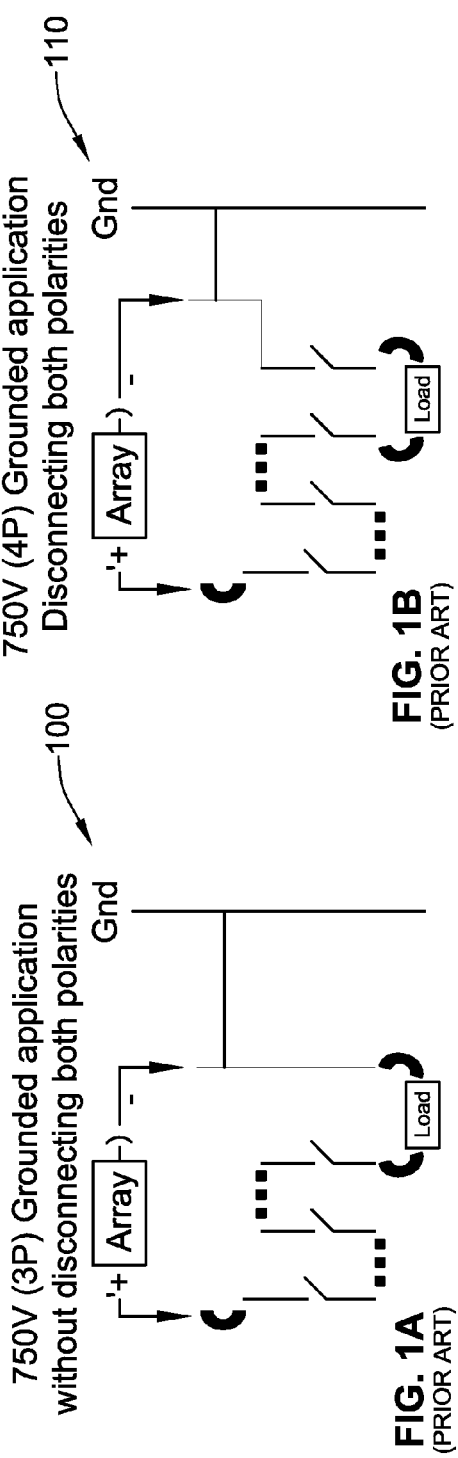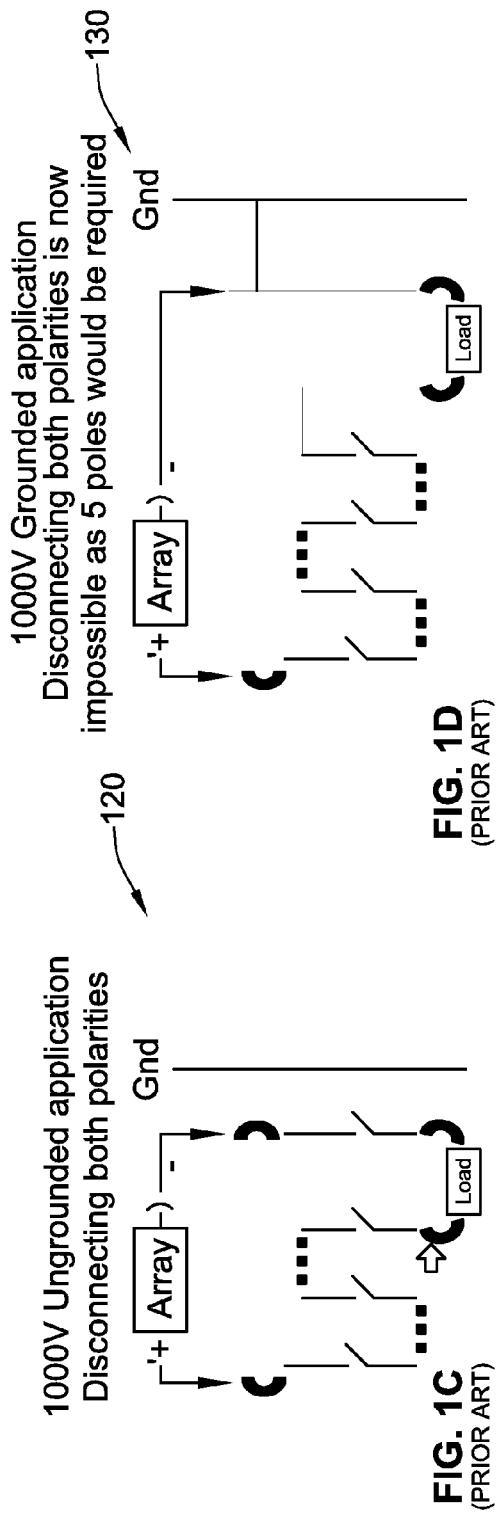

DRAWOUT DISCONNECTING AND ISOLATING MEANS FOR DC APPLICATIONS

FIELD OF THE INVENTION

The present invention relates generally to drawout assemblies, and, more particularly, to a drawout assembly having a multi-pole disconnect switch and a drawout unit for disconnecting and isolating equipment from grounded and ungrounded conductors in PV array systems.

BACKGROUND OF THE INVENTION

A solar photovoltaic (PV) array is a parallel arrangement of strings of series-connected PV panels. A string in the context of PV arrays, often referred to simply as a "PV string," is an arrangement of PV panels connected together in series to produce a voltage at a desired level for a downstream DC-to-AC inverter. As will be appreciated, solar PV arrays can occupy extensive surface areas. A typical PV system might contain multiple PV arrays and dozens or even hundreds of strings of PV panels.

A PV array is composed of multiple strings of PV panels. Each string output is received in a device called a combiner, which "combines" the currents from multiple strings into a larger conductor, called a busbar, for feeding downstream equipment and ultimately to a DC-to-AC inverter that converts the DC currents produced by the strings of PV panels into an AC current. The combiner can receive strings from multiple PV arrays.

In the combiner, which typically takes the form of an enclosure referred to as a "string combiner box," protection devices such as circuit breakers or fuses are used to protect against backfeeding current from one or more strings into another string. Backfeeding current into a PV panel can damage the wiring panel or otherwise adversely affect the performance of the PV array.

Both grounded and ungrounded PV systems are in widespread use. Even in the United States, where grounded electrical power distribution systems have historically been required, ungrounded PV systems are now permitted, provided a DC disconnect is provided for ungrounded conductors.

Typically, in a disconnect device, up to four poles are present, with each pole having a finite rated interrupting capacity at a certain maximum voltage per pole (for example, 250V per pole). This means that if all four poles are utilized in a PV system, the maximum system voltage that can be supported by a single protection device is 1000V. But if the user desires to ground one of the polarities (typically negative), there is no pole inside the disconnect device available to be disconnected simultaneously with the poles of the other polarity (typically positive). Thus, the user is faced with a Hobson's choice of leaving the grounded polarity in a "live" state where it cannot be disconnected, or reducing the system voltage supported to 750V to free up one of the poles for connection to the grounded polarity. In other words, until now, the user has to choose between total isolation of the source (better safety) and system voltage capacity. The present disclosure allows the user to have the proverbial cake and eat it, too.

FIGS. 1A-1D illustrate the limitations of existing configurations. In FIG. 1A, a 750V application (assuming 250V/pole) using a three-pole (3P) protection device is shown in a Grounded configuration 100. In this Grounded configuration, the positive polarity is disconnected using a 3P disconnect device, but the negative polarity is not. This configuration 100 uses a less expensive 3P device but does not allow disconnect of both polarities. To disconnect both polarities, a 4P device would have to be used as shown in FIG. 1B.

In FIG. 1C, a 1000V application using a four-pole (4P) protection device is shown in an ungrounded configuration 110. Here, three of the four poles are used to disconnect the positive polarity, and the remaining fourth pole is used to disconnect the negative polarity, allowing total disconnect of both polarities on a 1000V system. However, it is not possible to ground the negative polarity.

If the user wants to ground the negative polarity in a 1000V system, the user must leave the negative polarity incapable of being disconnected, as shown in FIG. 1D. In FIG. 1D, a 1000V application using a four-pole (4P) protection device is shown in a grounded configuration. But all four poles are used to disconnect the positive polarity, requiring the negative polarity to be incapable of being disconnected. Thus, only one of the polarities can be disconnected in this configuration. As can be seen between FIGS. 1A through 1D, the user has the choice to either disconnect only one of the two polarities or to leave one of the polarities ungrounded. This is not acceptable for users who desire to ground one of the polarities and to disconnect both polarities using a four-pole disconnect for a 1000V application (assuming 250V/pole).

SUMMARY OF THE INVENTION

Aspects of the present disclosure allow physical and electrical isolation and disconnection of both polarities from a DC current source, such as a PV array, in both grounded and ungrounded configurations, when there are not enough poles available to accommodate both polarities in a single disconnect device. The present disclosure allows all poles to be used on one polarity, for maximum system voltage supported by the total number of poles, while disconnecting both polarities from the DC source simultaneously. A drawout module having its own housing separate from an enclosure of a disconnect device that houses the multi-pole switching device is positioned, as a single unit, within a cradle of a drawout unit together with the disconnect device. The racking mechanism in the cradle operates to rack both the disconnect device and the drawout module in and out of the cradle simultaneously. One of the polarities (e.g., positive) is connected to the disconnect device, which passes the positive polarity of the DC current through all four series-connected poles of the switching device through the disconnect device. Thus, no poles are available for the negative polarity. The other polarity (e.g., negative), is connected to the drawout module, which has a through bar conductor that passes the negative polarity of the DC current through the drawout module. The disconnect device and the drawout module have corresponding electrical terminals or connectors for connecting to conventional electrical stabs in the cradle such that the racking mechanism can engage and disengage the connectors relative to the stabs by racking the drawout unit into and out of the cradle. When fully racked out, total isolation and disconnection of both polarities is achieved for maximum safety.

The foregoing and additional aspects and implementations of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

FIG. 1A is a schematic illustration of a prior-art 750V application (assuming 250V/pole) using a three-pole (3P) protection device in a Grounded configuration;

FIG. 1B is a schematic illustration of a prior-art 750V application using a four-pole (4P) protection device in a Grounded configuration;

FIG. 1C is a schematic illustration of a prior-art 1000V application using a four-pole (4P) protection device in an ungrounded configuration;

FIG. 1D is a schematic illustration of a prior-art 1000V application using a four-pole (4P) protection device in a Grounded configuration;

DETAILED DESCRIPTION

Although this detailed description will be described in connection with certain aspects and/or implementations, it will be understood that the present disclosure is not limited to those particular aspects and/or implementations. On the contrary, the present disclosure is intended to cover all alternatives, modifications, and equivalent arrangements included within the scope of the invention as defined by the appended claims. The application of the aspects of the present disclosure can be extended to any device of any size and rated voltage per pole, when all active poles are already used in one polarity.

Figure 2:
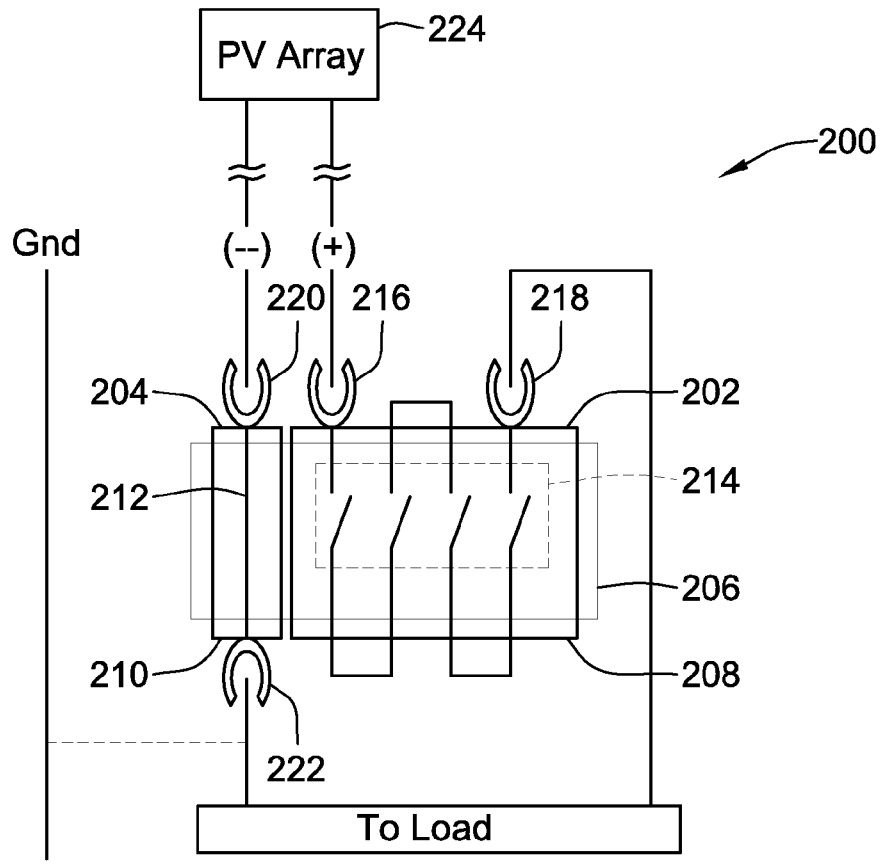
FIG. 2 is a schematic illustration of a drawout unit having a multi-pole disconnect device coupled to a drawout module, both of which are arranged in a cradle, according to aspects of the present disclosure.

FIG. 2 is a schematic of a drawout unit 200 having a multi-pole disconnect device 202 coupled to a drawout module 204 according aspects of the present disclosure. The disconnect device 202 and the drawout module 204 are arranged in a cradle 206, relative to which the disconnect device 202 and the drawout module 204 are simultaneously racked into and out of the drawout unit 200. The multi-pole disconnect device 202 is a protection device, such as a circuit breaker or a switch, and includes an enclosure 208 that houses the protection mechanisms and optional associated electronics including a four-pole switch 214 that series-connected a first polarity (e.g., positive polarity) between an input terminal 216 and an output terminal 218. Conventional or custom pole to pole connectors (or cables) can be used to connect the poles of the device in series, as required by the system voltage level. Likewise, the drawout module 204 includes a housing 210 that houses a conductor 212 or through bar electrically coupled between an input terminal 220 and an output terminal 222, which carries a second polarity (e.g., negative polarity) of a direct current (DC) from a source 224, such as a photovoltaic (PV) array. The terms enclosure and housing are synonymous and are used for ease of differentiating the housing or enclosure 208 of the disconnect device 202 and the housing or enclosure 210 of the drawout module 204. The enclosure 208 can be attached to the housing 210 so that the disconnect device 202 and the drawout module 204 can be racked in and out of the cradle 206 simultaneously. Alternately, the disconnect 202 and the drawout module 204 can be formed in a single enclosure or a housing, or can share a common wall among two distinct housings.

The conductor 212 has a cross section sized to carry the DC current from the source 224. Multiple (e.g., two, three, or more) drawout modules identical to the drawout module 204 can be ganged together in parallel within the cradle 206 in an alternate implementation. The width of the cradle 206 is increased by a commensurate amount to accommodate additional drawout modules.

Unlike the disconnect switch 202, the drawout module 204 lacks a switching pole in the housing 210 for disconnecting the input terminal 220 from the output terminal 222. The conductor 212 is a through bar that extends between the two terminals 220, 222. The switch 214 has exactly four poles such that none of the poles is available for the second (negative) polarity of the DC current in the disconnect device 202. This example configuration is like the configuration shown in FIG. 1C, except that the addition of the drawout module 204 now permits disconnection of the negative polarity as well, and the optional grounding of the negative polarity shown by the dashed line in FIG. 2. When the negative polarity is grounded, equipment external to the multi-pole disconnect device 202 is isolated from all ungrounded conductors in the multi-pole disconnect device 202. Alternately, the positive polarity can be grounded instead. In this example, each of the four poles of the switch 214 is rated at 250V per pole such that a maximum system voltage across the first and second polarities is 1000V. The first and second polarities represent positive and negative polarities of the DC current from the PV array 224, which can include multiple PV panels or strings of PV panels. The PV array 224 is part of a photovoltaic system that has a maximum system voltage rating above 600V, such as 750V or 1000V.

Figure 4:
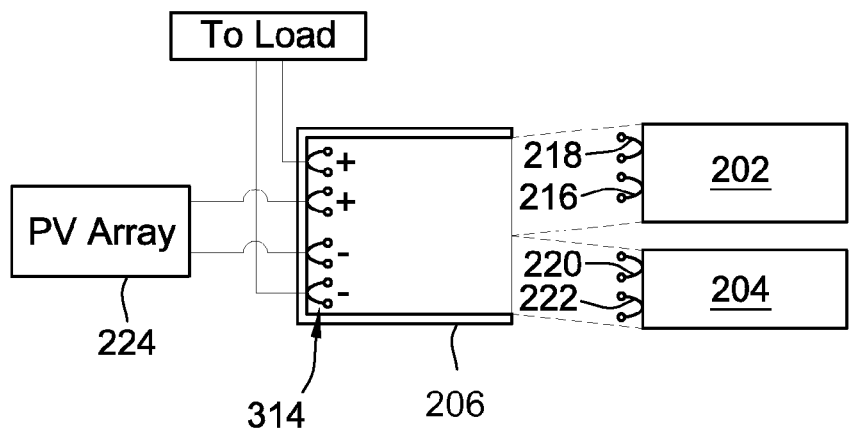
FIG. 4 is a block diagram of the disconnect device and the drawout module with their corresponding terminals and the cradle with its corresponding electrical stabs configured to receive the corresponding terminals of the drawout unit.
Figure 3:
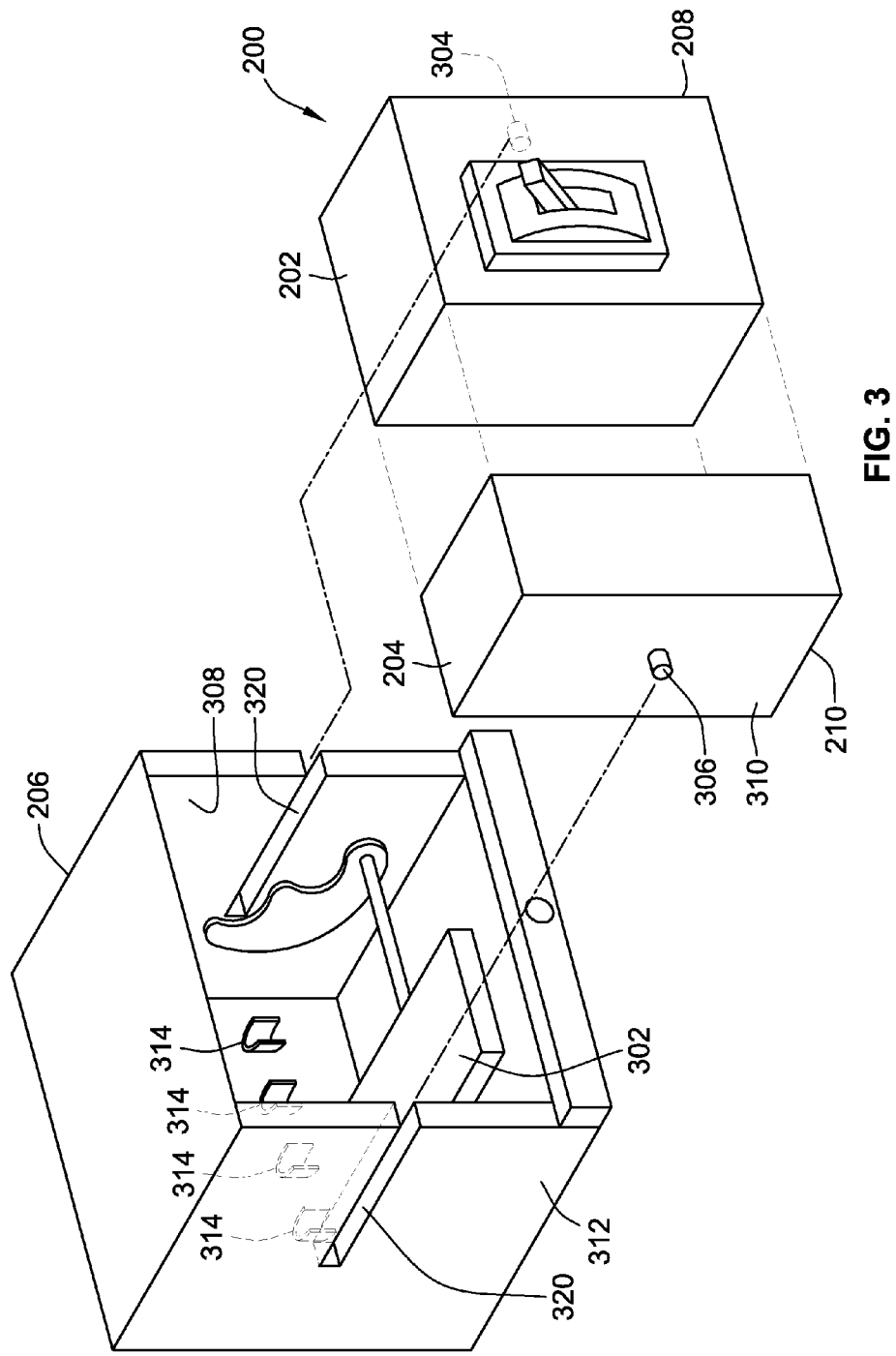
FIG. 3 is a perspective illustration of a disconnect device and a drawout module about to be installed into a single cradle.

FIG. 3 is a perspective illustration of the drawout unit 200 with the disconnect switch 202 and the drawout module 204 removed from the cradle 206. The cradle 206 includes a known racking or drawout mechanism 302 configured to cause the disconnect switch 202 and the drawout module 204 to move together between a racked-in position and a racked-out position. The racking operation can be performed manually by a human operator or automatically under control of a motorized drawout mechanism. An example of a suitable remote-operated, motorized drawout mechanism is described in U.S. Patent Application Publication No. 2011/0147173, entitled "Wireless Remote Racking Mechanism", filed Dec. 21, 2009. In the racked-in position the input terminal 216 and the output terminal 218 of the disconnect device 202 and the input terminal 220 and the output terminal 222 of the drawout module 204 are simultaneously electrically connected to electrical equipment (such as a switchgear) external to the drawout unit 200, thereby allowing DC current to flow from the DC source 224 through the drawout unit 200. In the racked-out position the input terminal 216 and the output terminal 218 of the disconnect device 202 and the input terminal 220 and the output terminal 222 of the drawout module 204 are simultaneously disconnected from the electrical equipment, thereby disallowing the flow of DC current from the DC source 224 through the drawout unit 200. A conventional interlock (not shown) can be incorporated with the mechanism 302 to require the disconnect device 202 to be tripped before permitting the drawout unit 200 from being racked in or out of the cradle 306. Although the output terminal 222 of the drawout module 204 is shown in the schematic illustration of FIG. 2 as being opposite the input terminal 220 for ease of illustrating a schematic representation of the drawout unit 200, the terminals 216, 218, 220, 222 are physically located on the back of the enclosure 208 and the housing 210, respectively, as can be seen in FIG. 4, described below.

The racking or drawout mechanism 302 has a well-known configuration, and the details of the mechanism 302 are neither essential nor necessary to implement or carry out aspects of the present disclosure. The notable aspect of the mechanism 302 is that it is configured to rack the disconnect device 202 and the drawout module 204 simultaneously in and out of the cradle 206. In the illustrated example, the disconnect device 202 includes a first 304 of two supports protruding away from a side of the enclosure 208 closest to a sidewall 308 of the cradle 206, and the drawout module 204 includes a second support 306 protruding away from a side 310 of the housing 210 closest to an opposite sidewall 312 of the cradle 206. As mentioned above, the enclosure 208 and the housing 210 can be attached or fused together or can share a common wall. Conventional stabs (only three are visible in the perspective view shown in FIG. 3) 314 receive clusters of connectors corresponding to the terminals 216, 218, 220, 222 protruding out of the backs of the enclosure 208 and the housing 210, as shown schematically in FIG. 4. The supports 306, 308 are coupled to rails inside the cradle 308 that allow the supports 306, 308 to slide in and out of slots 320 formed in the sidewalls 308, 312 of the cradle 308.

Thus, when all four of the poles of the switch 214 are used on a single polarity, equipment is isolated from all ungrounded conductors in compliance with the National Electrical Code (NEC) 490.22, which applies to PV systems with a maximum system voltage over 600Vdc (see NEC 690.8). Thanks to the drawout module 204, the drawout unit 200 is totally isolated from both polarities of the source 224. When the drawout unit 200 is in the racked out position, the operator can be confident that all polarities have been disconnected from the source 224, including any grounded polarity. The drawout unit 200 can be padlocked in the racked out position to ensure complete physical and electrical isolation of both polarities, whether grounded or ungrounded, from the source 224 for safely carrying out repair, inspection, installation, or maintenance on electrical equipment such as switchgear.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of the invention as defined in the appended claims.

What is claimed is:

1. A drawout unit, having a multi-pole disconnect device coupled to a drawout module, for disconnecting and isolating grounded and ungrounded polarities from a direct current (DC) source, the drawout unit comprising:
    a cradle;
    the multi-pole disconnect device including an enclosure, a disconnect switch having a plurality of poles each accepting a first polarity of a DC current, the poles being connectable in series, a device input terminal accepting one or more conductors carrying the first polarity of the DC current, and a device output terminal for providing the first polarity of the DC current to a load coupled to the drawout unit; and
    the drawout module having a housing, a module input terminal accepting a second polarity of the DC current, the second polarity being opposite to the first polarity, a module output terminal for providing the second polarity of the DC current to the load, and a conductor connecting the module input terminal to the module output terminal, where the multi-pole disconnect device and the drawout module are positioned in an abutting relationship in the cradle.

2. The drawout unit of claim 1, further comprising a drawout mechanism configured to cause the drawout unit to move between a racked-in position and a racked-out position, wherein when in the racked-in position the device input terminal and the module input terminal are simultaneously electrically connected to electrical equipment external to the drawout unit, thereby allowing the DC current to flow from the DC source through the drawout unit, and wherein when in the racked-out position the device input terminal and the module input terminal are simultaneously disconnected from the electrical equipment, thereby disallowing the flow of the DC current from the DC source through the drawout unit.

3. The drawout unit of claim 1, wherein the enclosure and the housing are composed of metal and are attached to one another.

4. The drawout unit of claim 1, wherein the drawout module lacks a disconnect switch in the housing for disconnecting the module input terminal from the module output terminal.

5. The drawout unit of claim 1, wherein the plurality of poles is exactly four poles such that none of the poles is available for the second polarity of the DC current in the multi-pole disconnect device.

6. The drawout unit of claim 5, wherein each of the four poles is rated at 250V per pole such that a maximum system voltage rating across the first and second polarities is 1000V.

7. The drawout unit of claim 5, wherein the first polarity is ungrounded.

8. The drawout unit of claim 1, wherein the first polarity is a positive polarity and the second polarity is a negative polarity.

9. The drawout unit of claim 1, wherein the positive polarity is ungrounded and the negative polarity is grounded such that electrical equipment external to the multi-pole disconnect device is isolated from all ungrounded conductors of the multi-pole disconnect device.

10. The drawout unit of claim 1, wherein the DC source includes a photovoltaic array of photovoltaic panels.

11. The drawout unit of claim 10, wherein the photovoltaic array is part of a photovoltaic system that has a maximum system voltage rating above 600 volts.

12. The drawout unit of claim 1, further comprising a second drawout module having a second housing, a second input terminal, a second output terminal, and a second conductor connecting the second input terminal with the second output terminal of the second drawout module, wherein the second drawout module is positioned to abut the drawout module in the cradle.

13. The drawout unit of claim 1, wherein the multi-pole disconnect device is a circuit breaker.

14. A drawout unit, having a multi-pole disconnect device coupled to a drawout module, for disconnecting and isolating grounded and ungrounded polarities from a direct current (DC) source comprising a photovoltaic (PV) array, the drawout unit comprising:
    a cradle having a drawout mechanism;
    the multi-pole disconnect device in the cradle and including an enclosure, a disconnect switch having exactly four poles within the enclosure, a device input terminal accepting a positive polarity of a DC current from the PV array, and a device output terminal for providing the positive polarity of the DC current from the device input terminal through the four poles of the disconnect switch connected in series and to a load being protected by the drawout unit; and the drawout module in the cradle adjacent to the multi-pole disconnect device, the drawout module having a housing, a module input terminal accepting a negative polarity of the DC current, a module output terminal for providing the negative polarity of the DC current to the load, and a through bar conductor in the housing and connecting the module input terminal to the module output terminal, wherein the drawout mechanism is configured to cause the multi-pole disconnect device and the drawout module to move simultaneously between a racked-in position and a racked-out position, wherein when in the racked-in position the device input terminal and the device output terminal and the module input terminal and the module output terminal are simultaneously electrically connected to electrical equipment external to the drawout unit, thereby allowing the DC current to flow from the DC source through the drawout unit, and wherein when in the racked-out position the device input terminal and the device output terminal and the module input terminal and the module output terminal are simultaneously disconnected from the electrical equipment, thereby disallowing the flow of the DC current from the PV array through the drawout unit.

15. The drawout unit of claim 14, wherein the negative polarity is grounded.

16. The drawout unit of claim 14, wherein the multi-pole disconnect device is a circuit breaker or a switch.

\* \* \* \* \*